Nov. 22, 1938.  A. J. ABRAMS  2,137,601

FILM MAGAZINE

Filed July 2, 1936

INVENTOR
ARTHUR J. ABRAMS
BY
ATTORNEY

Patented Nov. 22, 1938

2,137,601

UNITED STATES PATENT OFFICE 2,137,601

FILM MAGAZINE

Arthur J. Abrams, New York, N. Y.

Application July 2, 1936, Serial No. 88,564

1 Claim. (Cl. 88—17)

This invention relates to improvements in film magazines adapted for use in motion picture cameras.

Heretofore, magazines of this type were provided with means in the form of reels or spools for winding or unwinding the film within the magazine, and these means were arranged to be driven by the camera mechanism as the film is advanced past the exposure aperture of the magazine. In addition to the above means, a claw or sprocket or the like is employed for advancing the film.

The above type of magazine is necessarily quite complicated and relatively expensive, and considerable skill is needed for introducing such a magazine into a camera.

The present invention therefore, seeks to provide an improved form of magazine, which is not only of simple and very inexpensive construction, but is also readily introduced into a camera even by unskilled persons. Hence it is an object of the invention to provide a film magazine in which all spools and reels are omitted and in which a roll of film, provided with an initial "set" or curl, is placed in one film compartment to be intermittently moved past the exposure aperture to a position in another film compartment. The mentioned curl of the film causes said film to reform into a roll commensurate with its initial form, but of somewhat larger diameter and without the aid of any take-up mechanism.

A further object is the provision of a film magazine adapted for the housing of a film roll without the aid of spools or reels, and one which requires no take-up mechanism—one which requires no coupling or connection of any kind with any moving part of the camera other than the association of the claw or equivalent film advancing means, with the sprocket holes of the film.

The invention also seeks to provide simple means for applying a drag to the film as it is being moved from one compartment to the other to obviate promiscous unwinding of the film roll.

Another contemplated feature of the invention resides in the novel manner of attaining the pre-set film roll.

With the above and other numerous features, objects and advantages in mind, the invention resides in the embodiment thereof as illustrated in the accompanying drawing and as described in the following specification.

Figure 1:
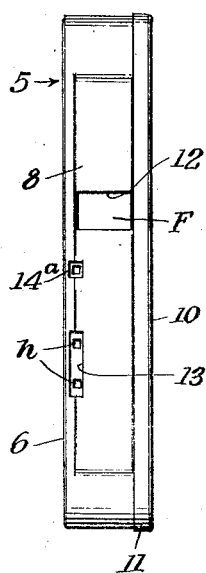
Fig. 1 is a front edge view of a film magazine as at present contemplated.

The film magazine comprises a casing 5 formed with a back wall 6, top and bottom walls 7, a front wall 8 and a rear wall 9. The cover 10 thereof also forms the front wall and is provided with a peripheral flange 11 for tight engagement with the front edges of the walls 7, 8 and 9.

In the present instance, the front wall 8 is provided with an exposure aperture 12 and with an elongated opening 13 so film advancing means, such as a claw or the like, may engage the sprocket holes $h$ of the film F in the magazine. If desired, another hole 14a may be provided to be employed for setting a sprocket hole $h$ in proper relation to the film advancing means and thus making certain that said means would surely engage the sprocket holes exposed by the opening 13.

Figure 2:
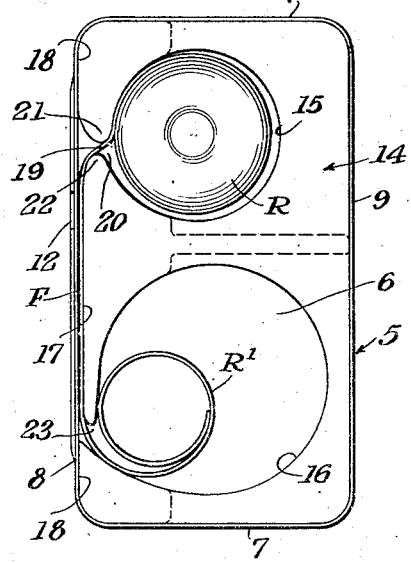
Fig. 2 is a side view thereof with the magazine cover removed.

The magazine is provided with an insert (Fig. 2) which may be of wood, Bakelite, or other suitable material. This insert shown at 14, is provided at its upper end with a substantially circular opening 15 and at its lower end with a somewhat larger similar opening 16. This opening forms film compartments, the compartment 15 serving to accommodate a film roll R and the compartment 16 serving similarly for the exposed film which forms the roll $R^1$.

Between the two compartments, the insert 14 is provided with a central portion terminating in a wall 17 adjacent to the magazine wall 8 and spaced therefrom a distance somewhat greater than the film thickness. The upper and lower portions of the insert are arranged with wall portions 18 designed to abut the wall 8 and to therefore insure the mentioned spacing between the walls 8 and 17.

In the above manner, the film may freely pass from the compartment 15 to the compartment 16, yet being maintained in a flat condition especially when passing by the exposure aperture 12. However, the speed at which the film is advanced, although intermittent, may cause promiscous unwinding of the film roll R and thus destroy the registration position of the sprocket holes $h$ exposed by the opening 13. It is, therefore, desired to retard the movement of the film except when positively moved by the film advancing means to prevent overrunning of the film. A simple manner of accomplishing this is to apply a drag on the film as by forming a kink or bend therein such as shown at 19 as the film passes through the throat 20 of the compartment 15. Said throat is formed by an upper lip 21 set inwardly in relation to a lower lip 22 on the insert 14. This form of throat also serves to wipe the film clean of dust or other foreign matter which may be on said film.

The throat 23 of the compartment 16 is arranged so the film may freely pass into said compartment after passing the opening 13.

It will be noted that, as the film enters the compartment 16, it immediately starts to recurl and it is essential that it do this otherwise the film may form divers serpentine loops which would fill the compartment and offer resistance to oncoming film thereinto. For this reason, the roll R is given an initial set or curl in substantially the following manner.

Figure 4:
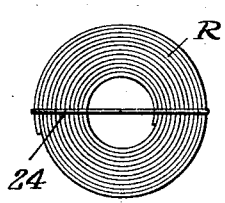
Fig. 4 is a plan view of a film reel employed in said magazine.

The film is first rolled up substantially as shown in Figure 4, and a band or the like is applied so it maintains its close wound condition. The roll is then subjected to a temperature in excess of any temperature it may encounter in ordinary usage. This will cause the emulsion, which is on one surface of the film, to soften and reset itself on the film so that said film is given an inherent tendency to curl under normal handling and storing temperatures. The roll is then rewound, with its outer convolutions innermost so that the exaggerated curvature of the innermost convolutions (now outermost) seek to maintain the roll in a close wound condition at all times thereafter.

Now, when a roll is placed in the compartment 15 of a magazine and its outer convolutions are strung past the magazine apertures to pass into the compartment 16, this end of the film will immediately seek a curled condition as shown.

Figure 3:
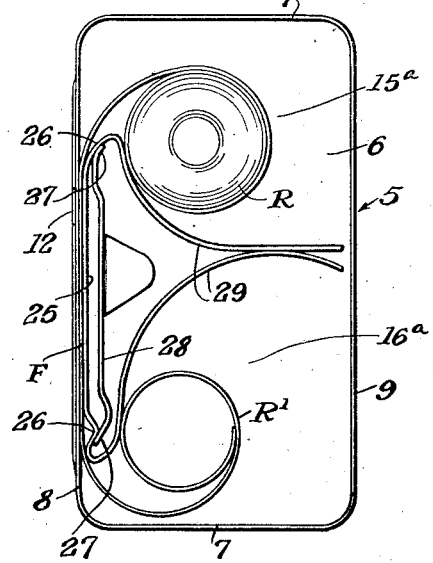
Fig. 3 is a similar view of a modified form of magazine.

Another form of film magazine is shown in Figure 3 wherein, instead of the fixed insert 14, a freely hung plate 25 is designed to lightly press against the film F. This plate is provided with an angulated portion 26 at each end which rides on an angled portion 27 formed on a bracket 28. It can be seen that the plate 25 is dragged downwardly by its light frictional engagement with the film and because of the angular engagement at 26 and 27, said plate is forced outwardly towards the front wall 8 of the magazine.

If desired, as shown, the plate 25 may be formed with reentrantly bent portions 29 to form compartments 15ª and 16ª commensurate respectively to compartments 15 and 16 previously described.

From the foregoing it can be seen that a film magazine, in its preferred forms, has been provided and that a film roll peculiarly adapted for use in such a magazine has also been provided. While this disclosure is at present preferred, it is obvious that skilled persons may employ the principles here set forth in various ways. Hence interpretation of the invention as claimed should rather be based on the prior art than on the instant disclosure.

I claim:

A film magazine having in combination a casing having an apertured wall, a bracket fixed within the casing, said bracket having extending arms substantially parallel with the apertured wall of the casing, the end of one of said arms being angled in a direction away from said apertured wall, the end of the other of said arms being angled in a direction toward said apertured wall, a member freely hung over said bracket and arms, said member having angled portions corresponding to the angled portions of the arms, passage space for a film strip between the apertured wall and said member, said member and said arm ends cooperating to urge the film strip into light frictional contact with the apertured wall during movement of said film in one direction.

ARTHUR J. ABRAMS.